United States Patent
Combee

(10) Patent No.: US 8,120,362 B2
(45) Date of Patent: Feb. 21, 2012

(54) SURVEYING A SUBTERRANEAN STRUCTURE USING ELECTROMAGNETIC MEASUREMENTS AND MICROORGANISM CONTENT DATA

(75) Inventor: Leendert Combee, Sandvika (NO)

(73) Assignee: WesternGeco L.L.C., Houston, TX (US)

( * ) Notice: Subject to any disclaimer, the term of this patent is extended or adjusted under 35 U.S.C. 154(b) by 893 days.

(21) Appl. No.: 12/168,122

(22) Filed: Jul. 5, 2008

(65) Prior Publication Data

US 2010/0001735 A1 Jan. 7, 2010

(51) Int. Cl.
*G01V 3/12* (2006.01)
(52) U.S. Cl. .................... 324/344; 324/365
(58) Field of Classification Search ............. 324/344, 324/365
See application file for complete search history.

(56) References Cited

U.S. PATENT DOCUMENTS

| | | | | |
|---|---|---|---|---|
| 2,725,281 A | * | 11/1955 | Bond | 436/31 |
| 4,653,336 A | * | 3/1987 | Vollweiler | 73/864.44 |
| 5,410,252 A | * | 4/1995 | Potter et al. | 324/345 |
| 5,507,357 A | * | 4/1996 | Hult et al. | 175/385 |
| 6,260,633 B1 | * | 7/2001 | Machek et al. | 175/20 |
| 6,454,023 B1 | | 9/2002 | Mercer et al. | |
| 2002/0096364 A1 | | 7/2002 | Brune et al. | |
| 2002/0169558 A1 | * | 11/2002 | Smith et al. | 702/5 |

FOREIGN PATENT DOCUMENTS

KR 10-2002-0085209 A 11/2002
WO 2005031389 A2 4/2005

OTHER PUBLICATIONS

Wagner et al., Case Histories of Microbial Prospection for Oil and Gas, Onshore and Offshore in Northwest Europe, SEG Geophysical References Series, 2002, pp. 453-479, No. 11.
PCT Search Report, dated Feb. 3, 2010, Application No. PCT/US2009/049250.

* cited by examiner

*Primary Examiner* — Bot Ledynh

(57) ABSTRACT

A survey apparatus for surveying a subterranean structure includes an electromagnetic (EM) sensing element to measure an EM field received from the subterranean structure, and a sample collector activatable to collect a sample of soil.

20 Claims, 3 Drawing Sheets

SURVEYING A SUBTERRANEAN STRUCTURE USING ELECTROMAGNETIC MEASUREMENTS AND MICROORGANISM CONTENT DATA

TECHNICAL FIELD

The invention relates to determining content of a subterranean structure based on electromagnetic measurements and microorganism content data.

BACKGROUND

Various electromagnetic techniques exist to perform surveys of a subterranean structure for identifying elements of interest. Examples of elements of interest in the subterranean structure include hydrocarbon-bearing reservoirs, gas injection zones, thin carbonate or salt layers, and fresh-water aquifers. One survey technique is the magnetotelluric (MT) survey technique that employs time measurements of electric and magnetic fields (which are responsive to naturally occurring electromagnetic fields) for determining the electrical conductivity distribution beneath the surface. Another survey technique is the controlled source electromagnetic (CSEM) survey technique, in which an electromagnetic transmitter, called a "source," is used to generate electromagnetic signals. With either survey technique, surveying units, called "receivers," are deployed on a surface (such as at the sea floor or on land) within an area of interest to make measurements from which information about the subterranean structures can be derived. The receivers may include a number of sensing elements for detecting any combination of electric fields, electric currents, and magnetic fields.

Although EM measurements have enabled operators to identify elements of interest within a subterranean structure, EM surveying can be subject to inaccuracies under certain conditions. For example, equipment failure, mis-positioning of EM receivers or EM sources, or mis-interpretation of EM data may lead to erroneous results.

SUMMARY

In general, according to an embodiment, to process survey data associated with a subterranean structure, electromagnetic (EM) measurements taken by an EM receiver are received. Also, microorganism content data relating to content of microorganisms in soil is also received. The content of the subterranean structure is determined according to the received EM measurements and microorganism content data.

In general, according to another embodiment, a survey apparatus includes an EM sensing element to measure an EM field received from a subterranean structure and a sample collector that is activatable to collect a sample of soil.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

In accordance with some embodiments, a surveying technique or mechanism uses both electromagnetic (EM) data and microorganism content data derived from a sample of soil collected by a sample collector. The EM data is collected by one or more EM receivers. From the EM data, resistivities in a subterranean structure can be calculated. The resistivities provide a direct indicator of fluid content and fluid property within the subterranean structure. For example, a low resistivity is indicative of a water-bearing or a dry reservoir, while a high resistivity is indicative of a hydrocarbon-bearing reservoir. Microorganism content data refers to data that describes content of a specific type (or specific types) of microorganisms, such as specific type (or types) of bacteria. Certain bacteria are known to exclusively (or primarily) feed on hydrocarbon fluids seeping from reservoirs in the subterranean structure to the earth surface. Measurement of the bacterial content provides a sensitive and direct indicator of hydrocarbon presence. Also, the bacterial content can be used to distinguish between gas and oil reservoir types.

By using both EM data and microorganism content data (collectively referred to as "survey data associated with a subterranean structure"), more accurate results can be obtained in determining content of the subterranean structure. The microorganism content data can be used to validate interpretations of the EM data (or vice versa). If inconsistencies in conclusions derived from the EM data and the microorganism content data are present, then an operator can perform analysis to determine the source of errors. By using the two types of survey data (EM data and microorganism content data), more accurate survey results can be achieved than using just EM data alone or microorganism content data alone.

Figure 1:
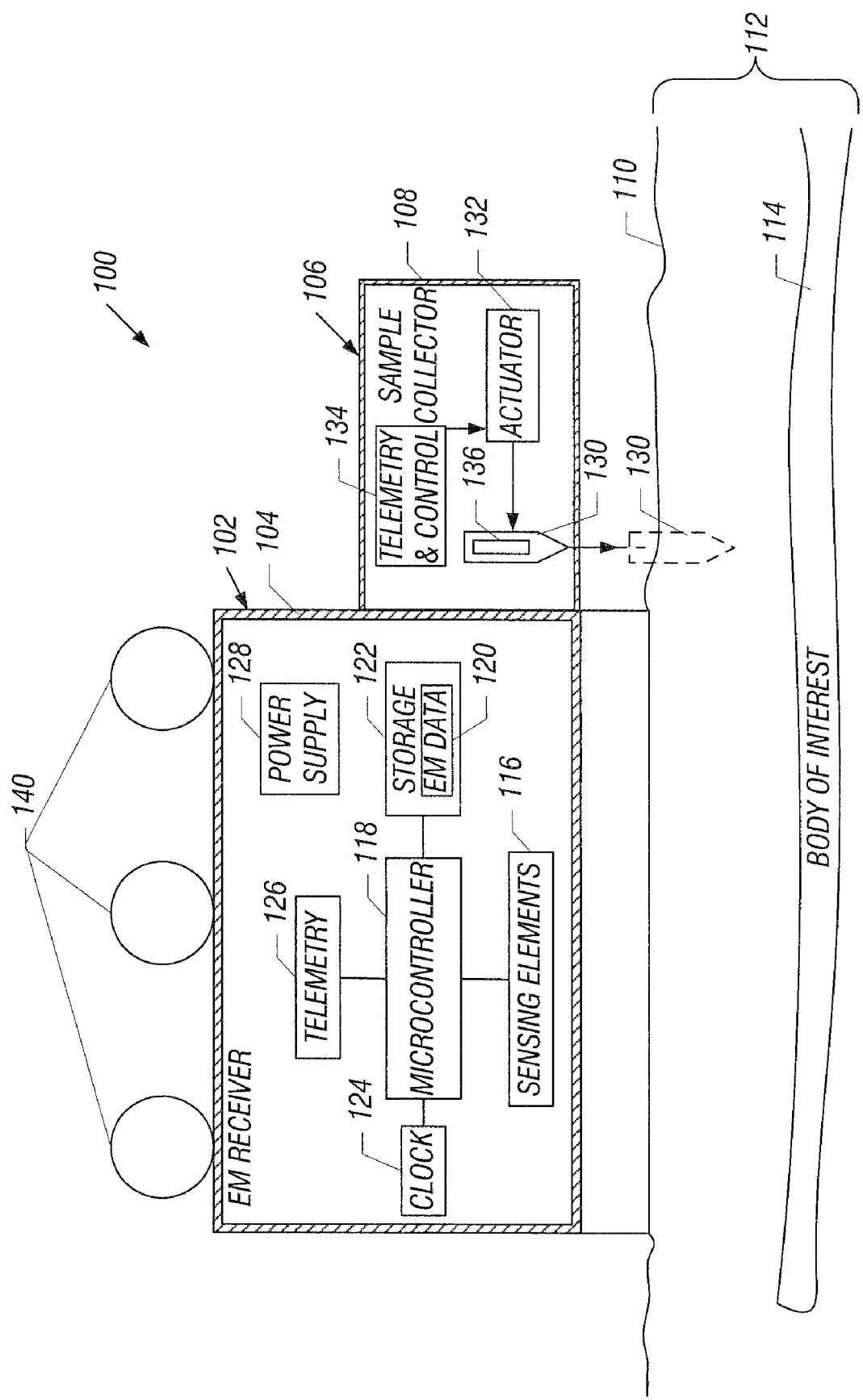
FIG. 1 illustrates an example arrangement that includes a survey apparatus that has an electromagnetic (EM) receiver and a soil sample collector, according to an embodiment.

FIG. 1 shows a survey unit 100 that can be used to collect EM data and collect a soil sample. The survey unit 100 includes an EM receiver 102 having an outer housing 104, and a sample collector 106 whose housing 108 is fixedly attached to the housing 104 of the EM receiver 102. By attaching the sample collector 106 to the EM receiver 102, an integrated survey unit 100 can be provided for ease of deployment and retrieval. Alternatively, instead of the sample collector 106 being fixedly attached to the EM receiver 102, the EM receiver 102 and sample collector 106 can be deployed as separate units that are in relatively close proximity to each other. As yet another alternative, one housing can be provided for the survey unit 100, where the one housing contains components of both the EM receiver 102 and sample collector 106.

As depicted in FIG. 1, the survey unit 100 is provided on an earth surface 110 (e.g., land surface or sea floor). Alternatively, although not depicted in FIG. 1, the survey unit 100 can be deployed along an inner surface of a wellbore.

The earth surface 110 sits above a subterranean structure 112 that includes a body of interest 114, such as a hydrocarbon-bearing reservoir, a gas injection zone, a fresh-water aquifer, a carbonate layer, or a salt layer, as examples.

The housing 104 of the EM receiver 102 defines a chamber that contains various components, including one or more sensing elements 116 (e.g., electrodes to measure magnetic and/or electric fields). More generally, the one or more sensing elements 116 are used to measure EM fields, where an "EM field" can refer to either an electric field, a magnetic field, or both.

The EM receiver 102 also includes a microcontroller 118 that is able to store detected EM fields as EM data 120 in a storage 122 of the EM receiver 102. The storage 122 can be implemented with memory such as a dynamic random access memory (DRAM), a synchronous DRAM (SDRAM), flash memory, or any other type of storage device. The EM receiver 102 also includes a clock 124 that can provide time information, where the time information can be stored with the EM data 120 such that the EM data 120 can be provided as a time series of data points for later processing.

Also, the EM receiver 102 can include a telemetry module 126 to allow the EM receiver 102 to communicate with a remote element. For example, the telemetry module 126 can include wireless telemetry circuitry to communicate wirelessly, such as by acoustic signals, EM signals, and so forth. In other implementations, the telemetry module 126 can be omitted.

The EM receiver 102 also includes a power supply 128, which can include batteries or other types of power sources. The power supply 128 supplies the power to the other components of the EM receiver 102 to allow for their operation. Along with the sensing element(s) 116, the microcontroller 118, clock 124, storage 122, telemetry module 126, and power supply 128 are also contained within the housing 104 of the EM receiver 102.

The one or more sensing elements 116 are able to detect EM fields emitting from the subterranean structure 112. The EM fields induced in the subterranean structure 112 can be in response to propagated EM signals from an EM transmitter (or EM transmitters). The EM signals transmitted by the EM transmitter(s) are propagated into the subterranean structure 112 from above the subterranean structure 112, with some portion of the EM signals reflected from the body of interest 114 back towards the EM receiver 102 for detection by the sensing element(s) 116. The use of EM transmitter(s) to induce EM fields in the subterranean structure 112 is according to a controlled source electromagnetic (CSEM) survey technique. Alternatively, instead of using EM transmitter(s), the sensing element(s) 116 can detect naturally occurring EM fields in the subterranean structure 112. This latter EM survey technique is referred to as a magnetotelluric (MT) survey technique.

The EM data 120 stored in the storage 122 is processed later when the EM receiver 102 is retrieved from the field. For example, the EM data can be provided to a computer for processing by the computer.

The sample collector 106 includes a moveable probe 130 that is moveable from a position inside the housing 108 of the sample collector 106 to a lower position that intrudes into a top soil layer in the earth surface 110. The probe 130 may be rotatable to allow for a drilling effect to enable the probe 130 to be drilled into the top soil layer (which may be up to 20 centimeters or more, for example). Alternatively, instead of a drilling effect, the probe 130 can be moved sharply downwardly to impact the earth surface 110 to cause the probe 130 to intrude to a certain distance below the earth surface 110.

Movement (linear movement and/or rotational movement) of the probe 130 is provided by an actuator 132. The actuator 132 (which can include a motor or other mechanism) is controlled by a telemetry and control module 134 in the sample collector 106. The telemetry and control module 134 is responsive to control signals (e.g., wireless control signals) that can be sent by a remote element for activating the actuator 132 to move the probe 130. The wireless control signals can be in the form of acoustic signals or EM signals, in some examples.

Instead of using a separate telemetry and control module 134, as depicted in FIG. 1, the microcontroller 118 and telemetry module 126 of the EM receiver 102 can be used instead to control activation of the actuator 132. The power supply 128 of the EM receiver 102 can be used to power the actuator 132. Alternatively, the sample collector 106 can include its own power supply.

If the survey unit 100 is deployed in a marine environment, then the survey unit 100 can be equipped with one or more buoyancy tanks 140 to allow for ease of deployment and retrieval from the sea floor 110. In a land-based environment, the buoyancy tanks 140 can be omitted.

The probe 130 has a container 136 to collect a sample of soil when the probe is moved into a layer of soil. When the survey unit 100 is retrieved, the sample of soil contained in the container 136 can be analyzed to detect content of one or more types of microorganisms, such as one or more types of bacteria.

Figure 2:
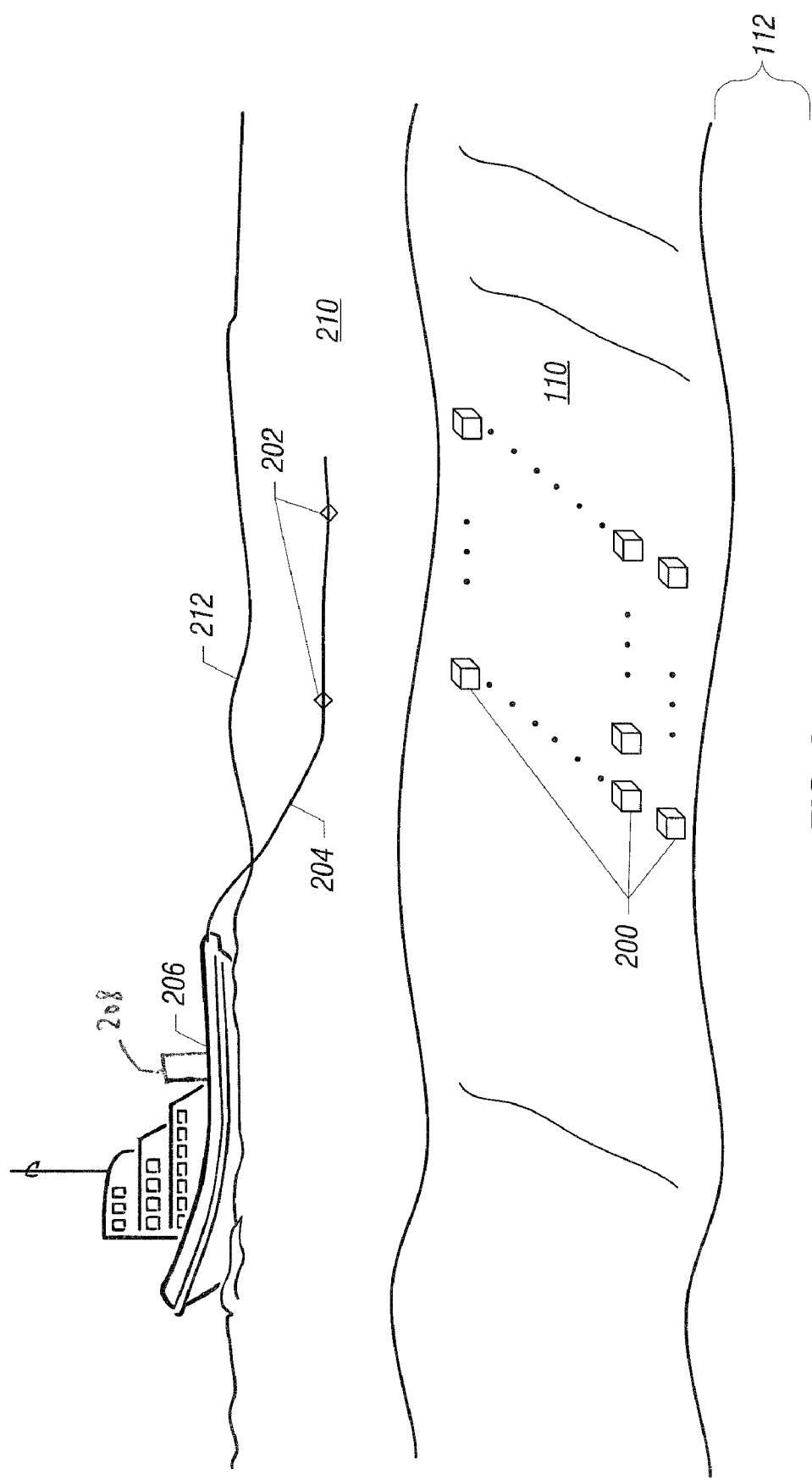
FIG. 2 illustrates an example marine arrangement to perform a survey according to an embodiment.

FIG. 2 shows an example marine surveying arrangement in which an array of survey units 200 are arranged on a sea floor 110 above the subterranean structure 112 that is to be surveyed. At least some of the survey units 200 can be according to the survey unit 100 of FIG. 1. In other words, at least some of the survey units 200 include both an EM receiver for collecting EM data and a sample collector for collecting a soil sample. Other ones of the survey units 200 can include just an EM receiver or just a sample collector. Providing survey units 200 across a relatively large area on the sea floor 100 allows for larger spatial coverage to achieve more accurate results, as the surveying can be based on EM data and soil sample data across a layer extent.

As noted above, each EM receiver in the survey units 200 can be used to detect EM fields received from the subterranean structure 112, where the EM fields received from the subterranean structure 112 can be induced by EM fields emitted by EM transmitters or induced by naturally occurring EM fields. For a CSEM surveying technique, one or more EM transmitters 202 on a tow cable 204 are towed by a sea vessel 206. A controller 208 on the sea vessel 206 can activate the EM transmitters 202 to emit EM signals that are propagated into the subterranean structure 112. The tow cable 204 and EM transmitters 202 are provided in a body of water 210 below a sea surface 212.

Although FIG. 2 depicts an example marine arrangement, it is noted that techniques or mechanisms according to some embodiments can be applied to a land-based surveying environment as well.

Figure 3:
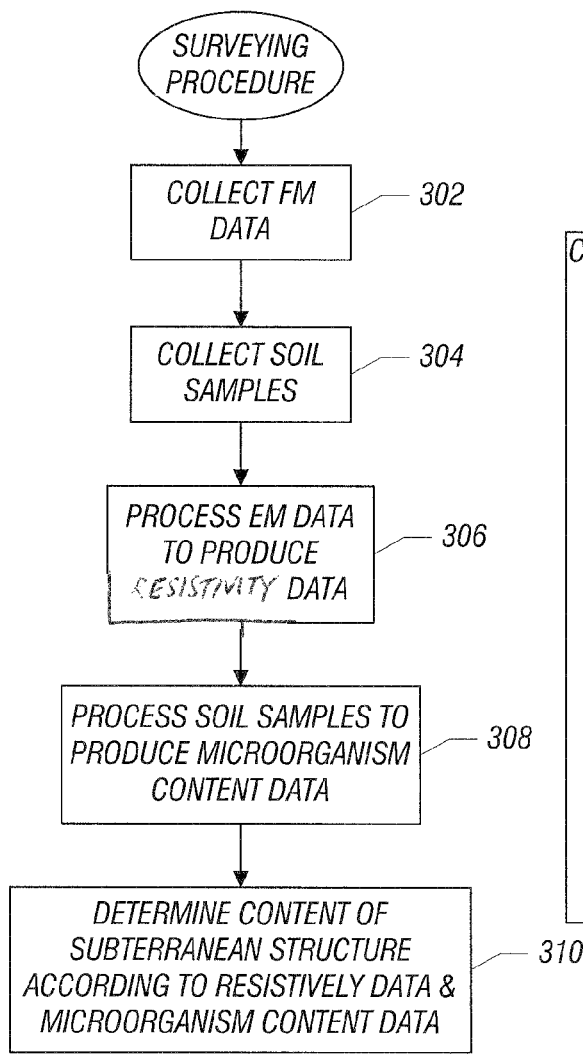
FIG. 3 is a flow diagram of a method of processing survey data associated with a subterranean structure, according to an embodiment.

A surveying procedure according to an embodiment is depicted in FIG. 3. The surveying procedure includes collecting EM data (at 302) using EM receivers that are part of at least some of the survey units 200 of FIG. 2. The surveying procedure also includes collecting (at 304) soil samples by sample collectors in at least some of the survey units 200.

Hydrocarbons or other fluids of interest may escape to the earth surface 110 from the body of interest 114 over time. The presence of hydrocarbons or other fluids at the earth surface 110 creates conditions that are favorable for the development of certain types of microorganisms that feed on the fluids. For example, specific type (or types) of bacteria feed exclusively (or primarily) on hydrocarbons. In the presence of hydrocarbons, the bacterial population increases significantly as compared to environments where the hydrocarbons are not present. Such microorganisms, if present, will be part of the soil sample collected by each sample collector.

The collected EM data and soil samples are then subject to post-processing. The EM data can be processed (at 306) at a computer, which can be located on the sea vessel 206 (FIG. 2), on land, or at any other location. Processing the EM data includes calculating resistivities from the EM data. Resistivities are commonly calculated using an inversion technique where the modeled response of a subsurface with a hypothetical resistive structure is compared with the collected EM data. Differences between the modeled response and collected data are used to adjust the hypothetical resistive structure of the subsurface such that said differences between modeled and collected data become minimal. The resistivities can be mapped to different points of a volume that represents a portion of the subterranean structure 112.

Also, the soil samples can be analyzed by sample analysis equipment to perform a count of certain type (or types) of microorganisms. The soil samples are processed (at 308) to produce microorganism content data. The microorganism content data can be mapped to a grid corresponding to the locations of the sample collectors provided on the earth surface 110.

According to the resistivity data and the microorganism content data, the content of the subterranean structure 112 can be determined (at 310). For example, high resistivity and high bacterial content would indicate that the body of interest 114 in the subterranean structure 112 contains hydrocarbons. On the other hand, low resistivity and low bacterial content would indicate that the body of interest 114 is a water-bearing reservoir or a dry reservoir.

However, high resistivity and low bacterial content can indicate one of the following: (1) the collected soil samples are contaminated or the soil is of the improper type; or (2) the body of interest 114 is formed of a high resistivity material that does not contain hydrocarbons. In case (1) above, further analysis can be performed by the operator on the soil sample to determine whether the soil sample is contaminated or the soil is of the proper type. If there is no soil contamination or improper soil type, then the operator can conclude that the body of interest contains a material of high resistivity that does not contain hydrocarbons.

Another possible result is low resistivity and high bacterial content. This can be due to one of the following: (1) EM measurements were improperly taken, either due to equipment failure, improper arranging of EM transmitters or EM receivers, or due to improper interpretation such as wrong models; or (2) the body of interest 114 contains a low resistivity fluid that has seeped to the earth surface 110 and that encourages growth of the microorganisms of interest. In the former case, further analysis can be performed by an operator to determine whether there in fact was a problem with EM data acquisition and/or EM data processing.

Note that since the resistivity data is mapped to different points of a volume that represents a portion of the subterranean structure 112, and the microorganism content data is mapped to a grid corresponding to locations of sample collectors provided on the earth surface 110, the resistivity data and the microorganism content data can be correlated to different locations of the subterranean structure 112. This allows for an operator to base analysis on EM data and microorganism content data collected from generally the same locations with respect to the subterranean structure 112.

By processing EM data and the microorganism content data together to provide survey results, increased accuracy is provided over conventional techniques in which EM data is used by itself or microorganism surveying is used by itself. Basing surveying on a reduced set of survey data, as conventionally performed, may produce erroneous results that an operator may not realize is erroneous. By processing both EM data and microorganism content data together, errors in one or the other can be detected. Alternatively, false errors can also be detected, such as where EM data may produce unexpected results that an operator may believe is erroneous, but interpretation of the microorganism content data will confirm that the EM-based results were in fact accurate.

Figure 4:
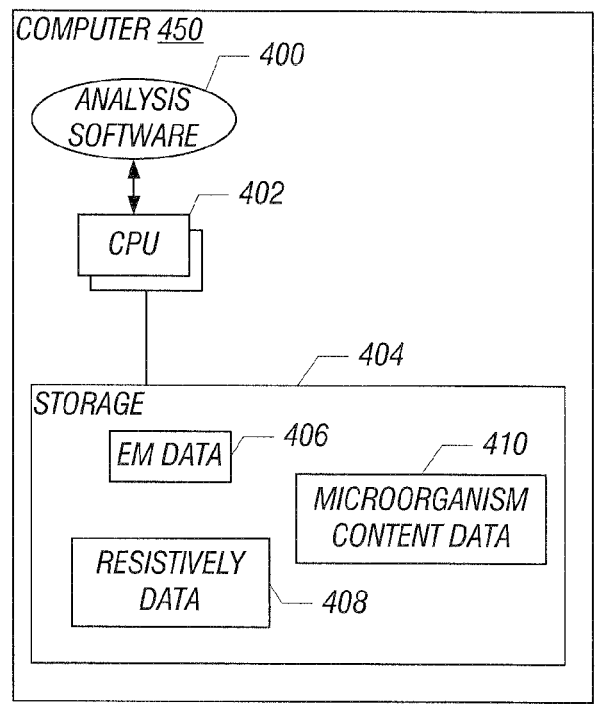
FIG. 4 is a block diagram of a computer in which software according to an embodiment is executable.

FIG. 4 shows an example computer 450 that has analysis software 400 to perform processing of EM data and microorganism content data as described above. The analysis software 400 is executable on one or more central processing units (CPUs) 402, which is (are) connected to a storage 404. The storage can store EM measurement data 406, resistivity data 408 calculated from the EM measurement data 406 (such as by the analysis software 400), and microorganism content data 410, which may have been provided by a sample analysis equipment that is able to analyze soil samples to count amounts of specific type or types of microorganisms. The resistivity data 408 and the microorganism content data 410 is used by the analysis software 400 to make the determination at 310 of FIG. 3.

Instructions of software described above (including analysis software 400 of FIG. 4) are loaded for execution on a processor (such as one or more CPUs 402 in FIG. 4). The processor includes microprocessors, microcontrollers, processor modules or subsystems (including one or more microprocessors or microcontrollers), or other control or computing devices.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A survey apparatus for surveying a subterranean structure, comprising:
   an electromagnetic (EM) sensing element to measure an EM field received from the subterranean structure;
   a sample collector activatable to collect a sample of soil, wherein the sample collector comprises a probe moveable into a layer of soil to collect the sample of soil, and an actuator to move the probe; and
   a telemetry module to send data relating to the measured EM field to a remote entity, wherein the telemetry module is to further receive a control signal to activate the actuator to move the probe.

2. The survey apparatus of claim 1, wherein the sample collector is remotely activatable by wireless signaling received by the telemetry module.

3. The survey apparatus of claim 2, wherein the sample collector is remotely activatable by one of acoustic signaling and EM signaling.

4. The survey apparatus of claim 1, further comprising:
a storage to store EM data detected by the EM sensing element; and
a container in the sample collector to carry the sample of soil.

5. The survey apparatus of claim 1, further comprising:
a housing containing the EM sensing element,
wherein the sample collector is attached to the housing.

6. The survey apparatus of claim 1, further comprising a power supply to power the sample collector and the EM sensing element.

7. A method of processing survey data associated with a subterranean structure, comprising:
receiving electromagnetic (EM) measurements taken by EM receivers;
receiving microorganism content data relating to content of microorganisms in a soil sample; and
determining content of the subterranean structure according to the received EM measurements and the received microorganism content data.

8. The method of claim 7, further comprising:
calculating resistivities in the subterranean structure based on the EM measurements; and
creating a map of the resistivities in the subterranean structure,
wherein determining content of the subterranean structure is according to the map of resistivities.

9. The method of claim 8, further comprising creating a map of microorganism content data that corresponds to locations of sample collectors,
wherein determining content of the subterranean structure is further according to the map of microorganism content data.

10. The method of claim 8, wherein determining the content of the subterranean structure comprises determining whether or not the resistivities are consistent with the microorganism content data.

11. The method of claim 10, further comprising:
identifying an error associated with the EM measurements or identifying an error associated with the microorganism content data in response to determining that the resistivities are inconsistent with the microorganism content data.

12. The method of claim 8, wherein determining the content of the subterranean structure is based on processing the resistivities and the microorganism content data together.

13. The method of claim 7, wherein determining the content of the subterranean structure comprises determining whether a body of interest is present in the subterranean structure, the body of interest selected from among a hydrocarbon reservoir, a gas injection zone, a fresh water aquifer, a carbonate layer, and a salt layer.

14. An article comprising at least one computer-readable storage medium containing instructions that when executed cause a computer to:
receive electromagnetic (EM) measurements taken by an EM receiver;
receive microorganism content data relating to content of microorganisms in soil; and
determine content of the subterranean structure according to the received EM measurements and the received microorganism content data.

15. The article of claim 14, wherein receiving the EM measurements comprises receiving EM measurements taken by plural EM receivers, and wherein receiving the microorganism content data comprises receiving the microorganism content data relating to plural soil samples taken by plural sample collectors.

16. The article of claim 14, wherein the instructions when executed cause the computer to further compute resistivities based on the EM measurements, wherein determining the content of the subterranean structure is according to the calculated resistivities and the received microorganism content data.

17. The article of claim 16, wherein the instructions when executed cause the computer to further identify inconsistencies between the resistivities and the microorganism content data.

18. A method of surveying a subterranean structure, comprising:
deploying a group of survey units on an earth surface above the subterranean structure, wherein each of at least some of the survey units includes both an electromagnetic (EM) receiver and a sample collector;
measuring EM data using the EM receivers; and
collecting soil samples using the sample collectors,
wherein a particular one of the at least some survey units includes a telemetry module, and the sample collector of the particular survey unit includes a probe to collect a respective soil sample, and an actuator to move the probe, the method further comprising:
sending the EM data measured by the EM receiver of the particular survey unit using the telemetry module; and
receiving a control signal through the telemetry module to activate the actuator to move the probe.

19. The method of claim 18, further comprising:
using wireless signaling to activate the sample collectors to collect soil samples.

20. The method of claim 18, further comprising:
providing the EM receiver and the sample collector as an integrated unit in each of the at least some of the survey units.

* * * * *